Sept. 7, 1948.   J. M. WOODSON   2,449,031
BRAKE CABLE ADJUSTER
Filed May 21, 1947
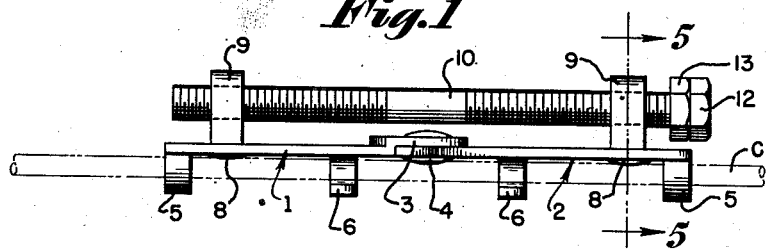
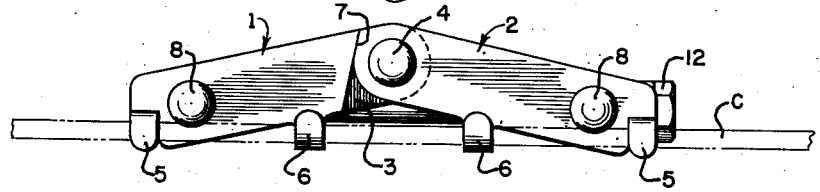
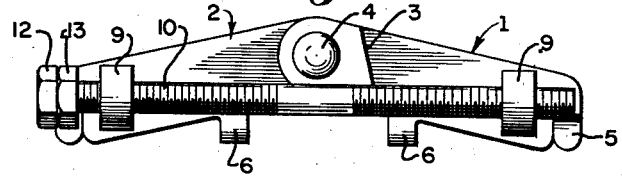
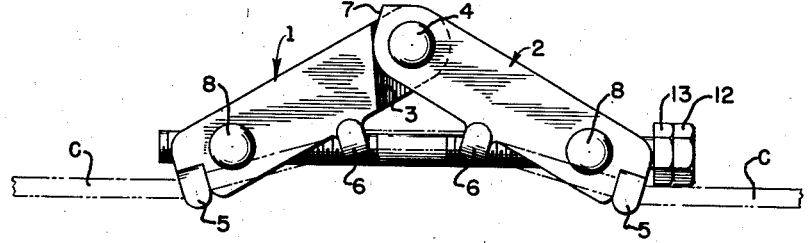
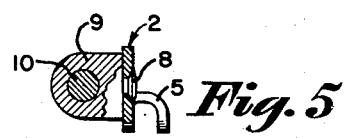
Inventor
JAMES M. WOODSON Patented Sept. 7, 1948

2,449,031

UNITED STATES PATENT OFFICE 2,449,031

BRAKE CABLE ADJUSTER

James Morris Woodson, Greenwood, Va.

Application May 21, 1947, Serial No. 749,614

8 Claims. (Cl. 24—71.1)

This invention relates to slack absorbers and more particularly to devices for absorbing the slack in cables, cords or the like, the ends of which are secured.

The invention has particular utility in connection with brake cables commonly used in automobiles for connecting the brakes with the brake operating mechanism.

An object of the invention is to provide an improved slack absorber for cables of simplified structure, lending itself to low cost and economical manufacture, and operating in a manner to minimize sliding friction on the cable in connection with its application.

Further objects will more particularly appear in the course of the following detailed description.

The invention consists in the novel construction, arrangement and combinations of parts hereinafter more particularly described and claimed.

One sheet of drawings accompanies this specification as part thereof, in which like reference characters indicate like parts throughout.

In the drawings:

Figure 1 is a side elevation of an embodiment of the invention in its extended position;

Figure 2 is a plan view of the device in the position illustrated in Figure 1;

Figure 3 is a bottom plan view of the device in the position of Figure 1;

Figure 4 is a top plan view showing the device contracted to eliminate the slack from the cable; and Figure 5 is a transverse cross section taken on line 5—5 of Figure 1.

As exemplified in the accompanying drawings, the device is preferably stamped from sheet metal, and comprises two arms, 1 and 2, which arms are connected by adjacent ends to form a pivot rule joint to which end one of the arms 1 is formed with an offset portion 3 at one end providing a seat for the adjacent end of the other arm 2, which arm 2 is formed with an end abutment shoulder 7 adapted to engage the abutment formed by the offset portion 3 of arm 1, thus limiting the angular adjustment of arms 1 and 2 to angles less than 180 degrees and precluding the device from assuming a straight longitudinal alignment of arms 1 and 2, it being desirable that these arms be maintained at a slight angle to provide a toggle joint with respect to the connecting pivot 4 by means of which their angularity can always be readily adjusted by the means hereinafter described.

Each of the arms 1 and 2 is provided with marginally positioned hook members 5 and 6, the hook members 5 adjacent the free ends of arms 1 and 2 opening outwardly or toward that margin of the arms, while the inner hooks 6—6 adjacent the pivoted ends of the arms 1 and 2 are oppositely disposed, opening inwardly toward the pivot pin 4.

On the opposite faces of the arms 1 and 2 are lugs 9—9 pivoted with respect to the arms 1 and 2, as by pivots 8, each of the lugs 9—9 being formed with a through-threaded orifice, the threads of the two lugs being opposite so as to accommodate the oppositely threaded ends of a bolt 10. On one end of this bolt 10 after it has had its ends threaded through the two lugs 9—9, is threaded a lock nut 13 and a fixedly secured head nut 12, by means of which the bolt 10 can be rotated.

The application of the device will be apparent from the drawings in which it will be noted that the cord or braking cable C is threaded between the aligned, oppositely disposed hooks 5 and 6, after which by rotating bolt 10 the angularity of the arms 1 and 2 is increased, as illustrated in Figure 4, thereby deflecting the cable C to eliminate the slack therefrom. After the cable has been drawn taut in this manner, the lock nut 13 will be screwed up tightly against the adjacent lug 9, thereby locking the device in adjusted position where it can remain, thus holding the cable in its tautened condition.

Various modifications in the precise details of the device will readily suggest themselves to those skilled in the art, but within the scope of the present invention as claimed.

Having thus fully described my invention, I claim:

1. Tightener for brake cords comprising two arms having adjacent ends pivotally associated to constitute a toggle joint, each of said arms having on one face oppositely disposed longitudinally spaced hooks and on the opposite face pivoted lugs, said lugs formed with oppositely threaded through orifices and a bolt having its end portions oppositely threaded to seat in said threaded orifices, whereby the angularity of said arms can be modified by rotation of said bolt.

2. The device of claim 1 in which the pivotally associated ends of the arms are formed with co-operating abutment portions limiting the movement of the arms to angles less than 180 degrees.

3. Device of claim 1 in which the oppositely disposed hooks on each arm are similarly disposed on the two arms, with the hooks nearest the free end of each arm opening outwardly with respect to the pivot of said arms.

4. Tightener for cables and the like comprising two arms of sheet metal connected by adjacent ends with a rule joint limiting their angular adjustment to angles less than 180 degrees, each arm having portions adjacent each end struck outwardly and bent transversely of the arm to constitute oppositely disposed cord embracing hooks, those hooks adjacent the rule joint opening toward said joint, and means for varying the angular disposition of said arms.

5. Tightener for brake cords or the like comprising two arms pivotally connected by adjacent ends, said arms each having marginal hooks adjacent their free and pivoted ends, said hooks adjacent the free ends of the arms opening toward that margin, said hooks adjacent the pivoted ends of the arms opening away from that margin, and means for adjusting the angularity of said arms.

6. Tightener for brake cords comprising two arms having their adjacent ends pivotally associated by a rule joint limiting their angular adjustment to angles less than 180 degrees, each arm formed with marginal spaced hooks adjacent each end, said hooks all disposed on similar faces of the two arms and oppositely disposed with the hooks adjacent the pivot opening toward the pivot, lugs pivotally mounted on the opposite face of each arm adjacent its free end, said lugs formed with oppositely threaded through orifices, and a bolt having oppositely threaded ends seated in said threaded orifices, whereby rotation of said bolt will modify the angularity of said arms as desired.

7. Brake cable tightener comprising a pair of arms pivotally connected at their adjacent ends and angularly disposed, direction changing means adjacent the pivotal axis of said arms, and remote from said axis on each arm, about which a cable is adapted to pass defining a bight corresponding to the angle between said arms, and a turnbuckle bridging the angle between said arms and connected thereto, for adjustably narrowing said angle thereby deepening the bight in the cable.

8. Tightener for cords, cables and the like comprising arms having their adjacent ends pivotally associated, lugs pivotally associated with the opposite ends of the arms, said lugs formed with aligned and oppositely threaded orifices, a bolt having oppositely threaded end portions seated in the said threaded orifices whereby the angularity of said arms can be varied, and means associated with said arms for engaging opposite faces of a cord to force said cord to conform in angularity with the arms.

JAMES MORRIS WOODSON.